United States Patent [19]
Cordell

[11] Patent Number: 4,821,296
[45] Date of Patent: Apr. 11, 1989

[54] DIGITAL PHASE ALIGNER WITH OUTRIGGER SAMPLING

[75] Inventor: Robert R. Cordell, Tinton Falls, N.J.

[73] Assignee: Bell Communications Research, Inc., Livingston, N.J.

[21] Appl. No.: 89,609

[22] Filed: Aug. 26, 1987

[51] Int. Cl.[4] .............................................. H03D 3/24
[52] U.S. Cl. ................................... 375/119; 375/83; 375/85; 375/111
[58] Field of Search ................... 375/83, 84, 85, 111, 375/118, 119

[56] References Cited

U.S. PATENT DOCUMENTS

| | | | |
|---|---|---|---|
| 4,216,544 | 8/1980 | Boleda et al. | 375/119 |
| 4,280,099 | 7/1981 | Rattingourd | 375/119 X |
| 4,414,676 | 11/1983 | Kraul et al. | 375/119 X |

*Primary Examiner*—A. D. Pellinen
*Assistant Examiner*—Derek S. Jennings
*Attorney, Agent, or Firm*—James W. Falk; Stephen M. Gurey

[57] ABSTRACT

The circuit phase aligns a phase-varying input data stream with a local clock. The data stream is sampled at the 0° and 180° phases of the local clock. Two pairs of outrigger samples which closely bracket the aforementioned primary samples are also obtained by the sextet sampler. Adjacent pairs of the six samples are applied to Ex-Or gates to yield disagreement signals which indicate the locations of data transitions relative to the samples. The primary samples (0° and 180°) are serially loaded into different halves of a biphase register, the taps of which provide the output with differently delayed versions of the input data at either 0° or 180°. A control circuit analyzes the disagreement signals and provides control signals to a counter which determines which of the biphase register taps is connected to the output. The output is a replica of the input which is synchronized with the local clock.

8 Claims, 10 Drawing Sheets

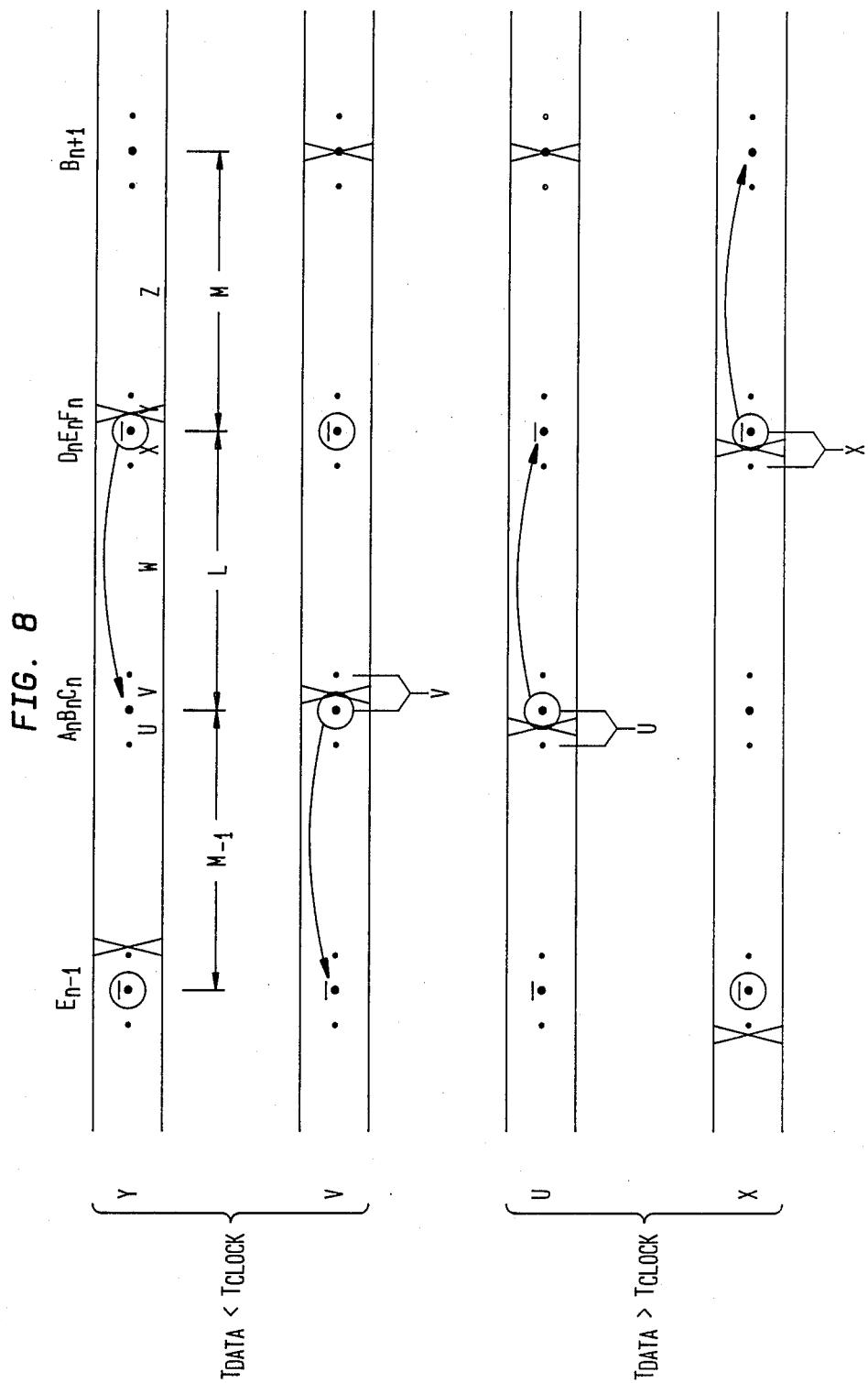

DIGITAL PHASE ALIGNER WITH OUTRIGGER SAMPLING

FIELD OF THE INVENTION

This invention relates to circuitry for phase aligning a plurality of randomly-phased incoming digital signals which all have the same synchronous bit rate but may have different and varying phases due for example to traversal of different signal paths and/or paths of different propagation velocities.

BACKGROUND OF THE INVENTION

By phase aligning all the incoming signals with a local clock at the system synchronous frequency or bit rate, the signals can all be subsequently synchronously processed at receivers or repeaters using the same local clock. Such alignment also obviates the need to route a clock with each data channel or to use timing recovery circuits to recover the clock from the data streams.

Digital telecommunication networks are evolving at higher transmission rates, due in large part to the wide bandwidth made available by lightwave technology. Such networks are also evolving toward synchronous architectures of the type described above, with the identical synchronous clock frequencies available throughout the network. Furthermore, phase slippage between such bit synchronous channels becomes a greater problem with high bit rates, since a small change in propagation velocity, for example caused by the heating of an optical fiber, can result in phase slippage of up to several time slots.

The need for phase alignment exists not only in copper and optical fiber transmission systems but also within systems locally, for example, from bay to bay, shelf to shelf, or even from board to board, where the high bit rates can result in differential delays of a substantial portion of a time slot, or even multiple time slot delays, even with small path length differences. A digital phase aligner must be capable of correcting phase errors of several time slots. One source of delay variation is the temperature coefficient of propagation delay of optical fibers, which can be of the order of 30 picoseconds/° C. Different temperature variations along different transmission paths can result in several time slots of phase excursion when the bit rate is of the order of 150 megabits/sec.

Prior art techniques of achieving phase alignment include the use of a FIFO (first in-first out) shift register and, a phase locked loop, arranged to recover the phase-varying clock frequency of the incoming data stream. The recovered clock is then used to clock the incoming data into the FIFO register and a local master clock is used to clock it out thereof. Each of the incoming channels employs such a FIFO and phase locked loop and each uses the same master clock. This circuitry requires more hardware than the present invention.

In my co-pending application entitled "Digital Phase Aligner", Ser. No. 946,323 filed Dec. 24, 1986, which issued on July 5, 1988 as U.S. Pat. No. 4,756,011, a first generation phase aligner, hereinafter referred to as DPA1, is disclosed and claimed. The differences between the DPA1 and the recent invention are explained in detail below.

SUMMARY OF THE INVENTION

The present invention is a second generation digital phase aligner and will be referred to hereinafter as the DPA2. The DPA2 is similar in concept to the aforementioned DPA1 but has several significant advantages in both performance and simplicity of circuitry.

The operation of both of these phase aligners takes advantage of the known synchronous bit rate of the input signals and the fact that they are relatively clean. Both DPAs employ multiphase sampling. To recover the correct data from the phase-varying input stream, the data is sampled at two phases (0° and 180°) of the local clock. One of these two samples will contain the correct data. As the phase relationship between the incoming data and the clock changes, the sampled phase which contains the correct data may also change. The in-phase (0°) and anti-phase (180°) data samples are loaded into separate halves of a biphase shift register and the output of a control circuit is used to determine from which shift register tap, or stage, the output is taken. The different stages or taps of the biphase register represent the data signal at different points in time, and thus at different phases, and by selecting the proper tap, phase excursions of the input data can be accommodated without loss of data. Since the biphase register is clocked by the local clock, the output will be synchronized or aligned therewith.

The DPA1 generates disagreement signals from four quadrature samples taken at the 0, 90, 180 and 270 degree phase of the local clock, which disagreement signals indicate the locations of the data transitions relative to the local clock. The quadrature samples are obtained from the output of a quartet sampler which has as inputs both the local clock and a quadrature version thereof. A change in the pattern of disagreement signals indicates a phase slippage and the direction thereof. A control circuit analyzes these disagreement signals and upon phase slippage produces an Up or Down binary signal which increments or decrements an UP-DOWN counter, the reading or count of which selects one of the taps of the biphase register for application to the output. The output selection changes from the in-phase to anti-phase sample, or vice versa, within the currently selected bit whenever the selected sample approaches a data transition. The newly selected sample will always be the sample of the opposite phase which is more centrally located within the same data bit or time slot.

The DPA2 differs from the DPA1 in that it uses a form of multiphase sampling called Sextet Outrigger Sampling in which the in-phase (0°) and anti-phase (180°) samples are each preceded and followed (or bracketed) by a pair of outrigger samples, for a total of six samples per clock period. The spacing in time of the outrigger samples from their primary samples can be determined by brief circuit delays which need not be precise. In fact, these delays can be generated by ordinary circuitry such as inverters, which can be part of the VLSI chip circuitry. This arrangement obviates the need for a quadrature version of the local clock, as is required in the DPA1. Also, since the open space between the two clusters of samples can be substantially more than 90°, the DPA2 will function properly with eye closures of greater than 90°. Because of the 90° spacing of the samples therein, the DPA1 is limited to use with signals with eye closure of less than 90°.

A key concept of the present invention is that the outrigger samples act as "feelers" of "bumpers" which generate disagreements as they bump into a data transition and cause the control circuit to make an appropriate change in sample selection before the nearby primary sample (the in-phase or anti-phase sample) crosses the transition and thus produces an error. The outrigger sample spacing, from their primary samples, for a 150 megabit version of the DPA2 in 2 micron CMOS can be about 0.5 nanosecond, which is approximately 1/13 or 27° of the 6.67 nanosecond time slot. As stated above, outrigger sample spacing is not critical and spacings of from 1° to 90° are possible and feasible, depending on both circuit speed and bit rate. Close spacing will result in the accommodation of larger eye closures and spacing approaching 90° will result in eye closure performance comparable to that of the DPA1.

It is thus an object of the invention to provide an inexpensive means of phase alignment for multiplexed digital communication networks where the average clock frequencies are all precisely the same but where incoming digital data streams may have different and varying phases of up to plus or minus several time slots, and wherein the phase alignment is accomplished by sampling the data streams at in-phase anti-phase sampling points of a local clock plus at a pair of outrigger sampling points which straddle the in-phase and anti-phase points. The primary (in-phase and anti-phase) samples are applied to different halves of a biphase register and the DPA output is obtained from one of the taps of said register. A control circuit analyzes the six samples and determines therefrom the presence and direction of any phase slippage between the input data stream and the local clock and selects the biphase register tap which contains the correct data. The output of the control circuit increments an UP-DOWN counter for one direction of phase slippage and decrements the same counter for the opposite direction of slippage. The counter reading or state controls a multiplexer which connects the proper register tap to the DPA output.

A further object of the invention is to provide an improved digital phase aligner which can accommodate data eye closures of more than 90° and in which outrigger sample spacing can be determined by simple, non-critical, on-chip circuitry.

A further object of the invention is to provide a digital phase aligner which can be implemented with all-digital circuitry so that low-cost VLSI technology can be utilized.

A further object is to provide a DPA of the type described which is robust in the presence of data noise and intersymbol interference which causes false data signal transitions.

A still further object of the invention is to provide an improved digital phase aligner which employs outrigger sampling in which two primary samples of an incoming data stream are each bracketed (surrounded or straddled) by a pair of closely-spaced outrigger samples which can be generated by means of on-chip circuit delays. The circuit employs a biphase register to which the two primary samples are applied. A phase-varying data signal can be aligned to the local synchronous clock which generates the samples and clocks the biphase register. When any one of the outrigger samples crosses a data transition a disagreement signal will be generated which will appropriately change the biphase register tap which is connected to the output, so that the other primary sample which is approximately centrally located in the same data time slot is selected for connection to the DPA output. The output will thus contain the same data as the phase-varying input but it will be synchronized with the local clock.

Alternately stated, an object of the invention is to provide an improved DPA comprising means to obtain primary samples of an input non-return-to-zero input data stream at the 0 and 180 degree points of a local clock as well as means to obtain pairs of outrigger samples which bracket each of said primary samples, means to apply said primary samples to different halves of a biphase register which is clocked by said local clock, and a digital control circuit which determines disagreements between said six samples and upon a disagreement between either of said primary samples and either of its outrigger samples produces either an Up or Down binary signal which is used to increment or decrement an UP-DOWN counter the output or reading of which determines which of the taps of said biphase register is connected to the output of said DPA.

Another object of the invention is to provide an improved digital phase aligner for aligning a phase-varying bit-synchronous digital signal data with a synchronous local clock, which circuit employs multiphase sextet sampling to determine phase slippage between the input data stream and the local clock and in which the samples comprise a pair of primary samples at the 0 and 180 degree phases of the local clock with pairs of outrigger samples bracketing said primary samples, resulting in a pair of three-sample clusters during each clock cycle.

These and other objects and advantages of the invention will become apparent from the following detailed description and the drawing, in which:

BRIEF DESCRIPTION OF THE DRAWINGS

FIG. 8 are waveforms which illustrate the basic control algorithm of the circuit.

DETAILED DESCRIPTION

Figure 1:
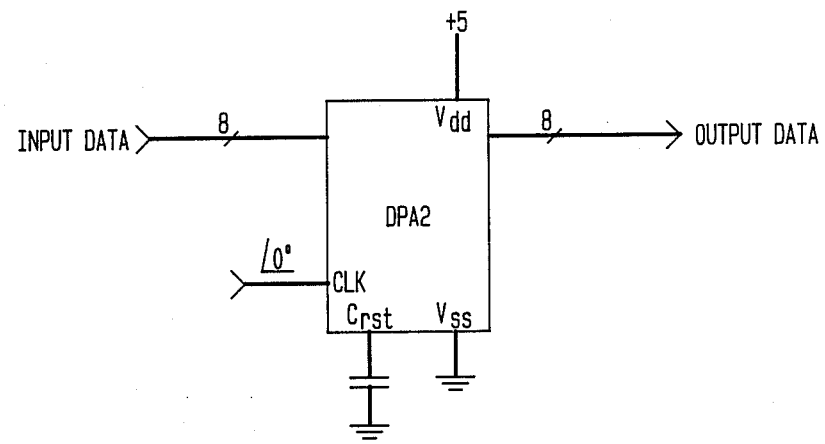
FIG. 1 shows an 8-channel DPA2 implemented on a single chip.

FIG. 1 shows how an 8-channel digital phase aligner of the present invention can be implemented on a single 2-micron CMOS chip using Very Large Scale Integration techniques. The only external connections required are the positive power supply $V_{dd}$, ground $V_{ss}$, a single local reference clock at 0° phase, the eight lines of input data with random phase variations among the eight different data streams, and the eight-line output data, all lines of which are aligned and synchronized with the local clock. A capacitor is connected to the $C_{rst}$ terminal for provision of an automatic power-on reset function. All of the six samples may be generated with only the single 0° clock, the two primary samples being generated by the positive and negative-going transitions of the single clock waveform and the outrigger samples being generated by inherent circuit delays of on-chip amplifiers, inverters, or other circuitry. This results in simpler external circuitry compared to the DPA1.

Figure 2:
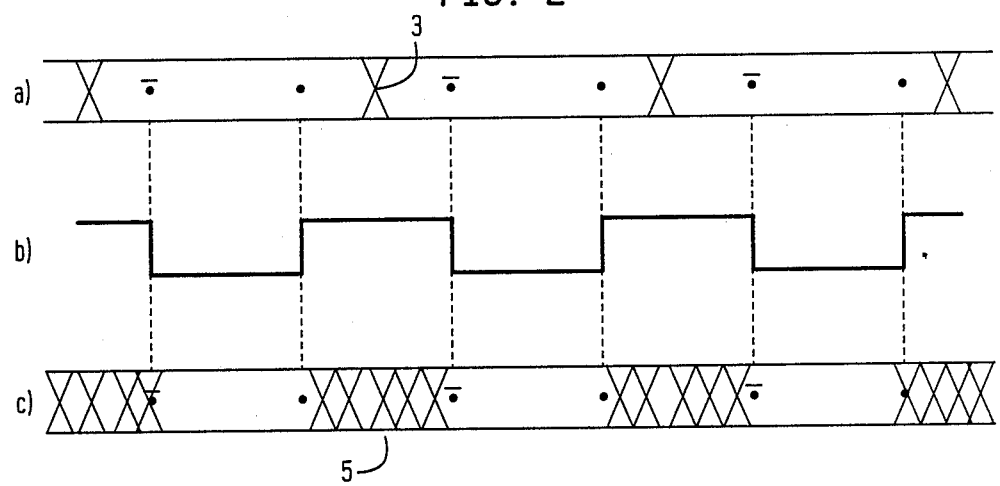
FIGS. 2 and 3 are waveforms showing how multiphase sampling can be used to achieve phase alignment.

FIG. 2a shows a non-return-to-zero (NRZ) digital data signal being sampled at the zero (in-phase) and 180° (anti-phase) points of a local clock, shown in FIG. 2b. In FIG. 2a the data stream is shown as it would appear on an oscilloscope screen and thus comprises a pair of horizontal lines representing the two voltage levels, 0 and 1, connected by Xs, such as 3, representing the data transitions. A data transition is a change in voltage level as the signal changes from binary 0 to binary 1, or vice versa. The upwardly sloping portion of the Xs, as one travels to the right in FIG. 2a represent transition from 0 to 1 and the oppositely sloped portions, 1 to 0 transitions. The in-phase samples are represented by a dot and are taken on each positive-going transition of the clock signal of FIG. 2b. The anti-phase samples are taken on each negative-going clock transition and are represented by a dot-bar (˙-). FIG. 2c shows a sampled data stream in which the data eyes are partially closed as a result of timing jitter and/or intersymbol interference, which results in transitions which rapidly bounce back and forth in time. Such jitter will cause multiple transitions to appear on an oscilloscope screen, such as 5 of FIG. 2c. It can be seen from FIG. 2c that as long as the eye closure is less than 180°, one or the other of the in-phase or anti-phase samples will always contain the correct data. Such a process is called biphase sampling.

Figure 3:
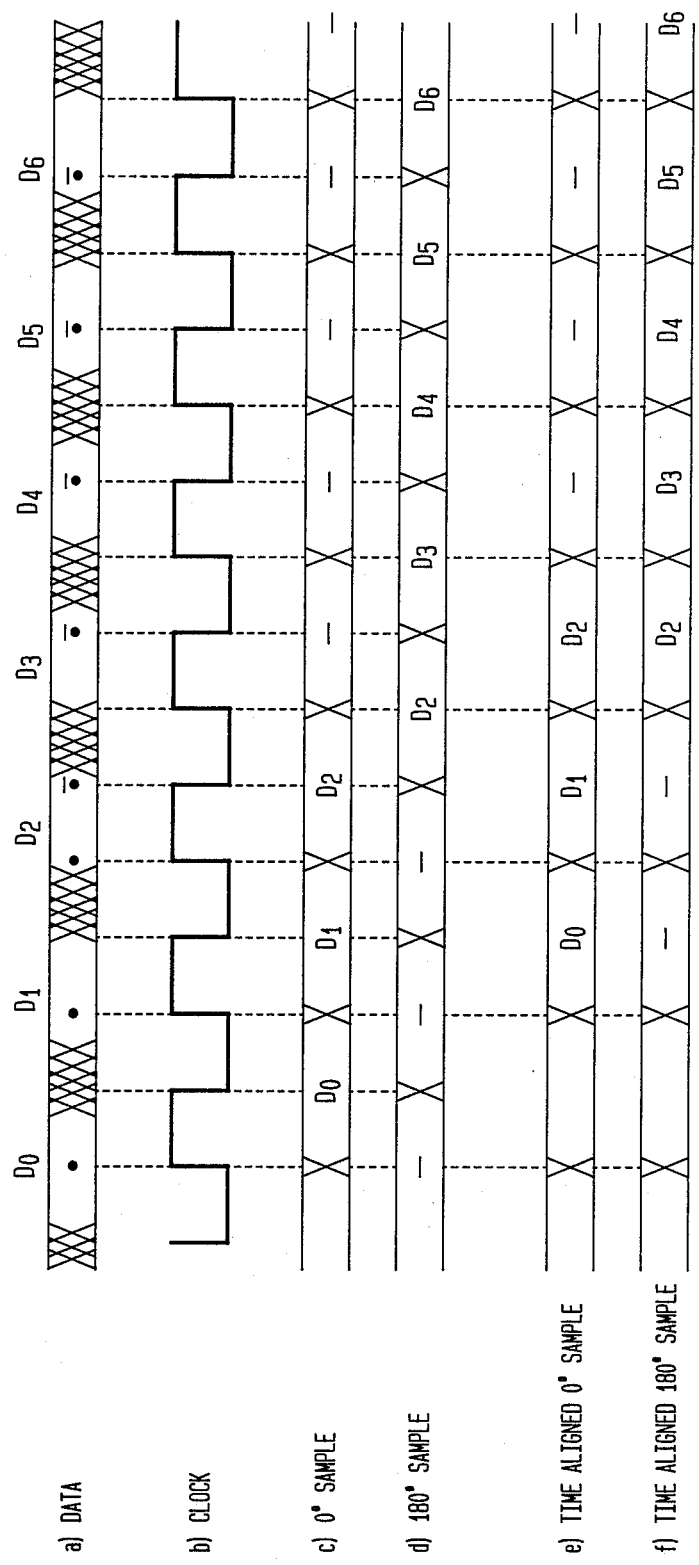

FIG. 3 illustrates a more detailed view of biphase sampling and phase aligning. FIG. 3a is a waveform of a data stream with eye closure of slightly less than 180°, in which the sample points are drifting to the left in the data eyes because the data period is greater than the clock period (clock fast). The data time slots are numbered $D_0$–$D_6$. FIG. 3c shows the in-phase samples aligned with the positive-going transitions of the clock of FIG. 3b and FIG. 3d shows the anti-phase samples aligned with the negative-going transitions of the clock. The time slots in which samples are obscured by the closed data eyes are marked with dashes. FIGS. 3e and 3f show the samples of FIGS. 3c and 3d time-aligned with the next 0° clock transition. The concept of the architecture for data recovery can be seen from these time-aligned samples. It is apparent that the first two data bits, $D_0$ and $D_1$, must be obtained from the in-phase samples, the bit $D_2$ can be obtained from either one of the samples, and the remainder of the bits, $D_3$–$D_6$, must be obtained from the anti-phase samples. It can be seen from FIG. 3 that the proper selection of one or the other of the two primary samples can result in correct data, synchronized with the clock, for data eye closures approaching 180°.

Figure 4:
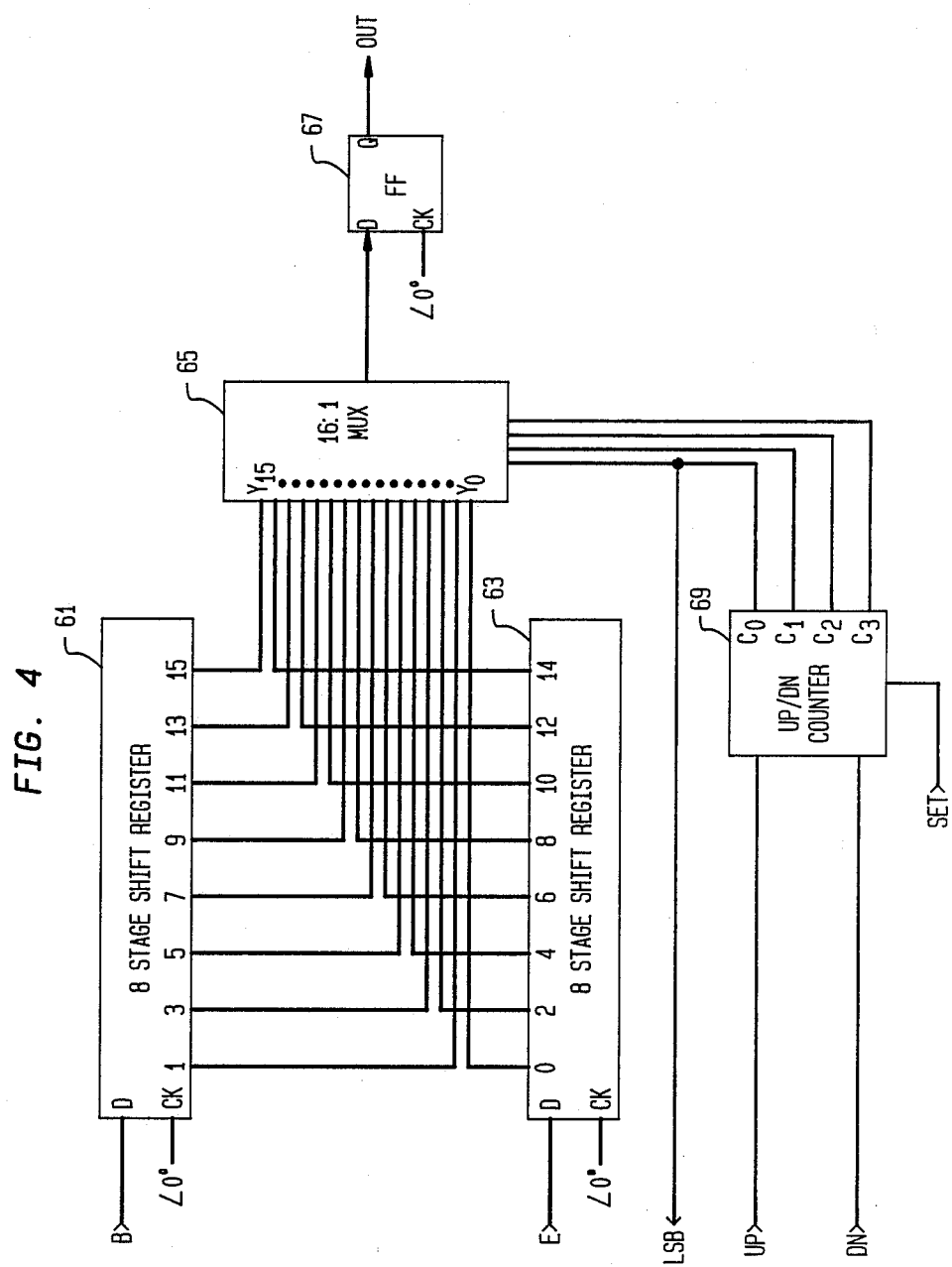
FIG. 4 is a block diagram of the biphase register which is part of the DPA2.

As stated above, for both the present invention and the DPA1, the in-phase and anti-phase samples are serially loaded into separate shift registers which comprise part of the biphase register. FIG. 4 is a block diagram of such a biphase register. It comprises two 8-stage shift registers 61 and 63. The register 61 receives at its serial input D the in-phase or B time-aligned data samples and the shift register 63 the anti-phase or E time-aligned samples. The 4-bit binary UP/DOWN counter 69 receives Up or Down signals from the digital control circuit, to be described, and the binary outputs $C_0$–$C_3$ of the counter determine which of the 16 register taps (0–15) is selected by 16 to 1 multiplexer 65. The multiplexer output is applied to delay flip-flop 67, and Q output of which is the selected and synchronized data stream. The stages of the register 61 have odd numbers and those of register 63 have the interleaved even numbers. The register taps are connected to the multiplexer in numerical order from $Y_0$ to $U_{15}$, thus each time the UP/DOWN counter is incremented or decremented by one count the selected sample changes to the opposite sample which is one half of a time slot away. A signal applied to the set input of counter 69 will reset it to the approximate middle of its range (1000), so that phase excursions of plus or minus 4 data time slots can be accommodated, in steps of half of a data time slot. If phase excursions exceed this range, the counter is designed to "wrap" back to its mid-range instead of wrapping around. The counter output $C_0$ is fed back to the control circuit as signal LSB (least significant bit). If LSB is 1 the in-phase sample is being selected and if it is 0, the anti-phase sample is being selected. Note that register taps further to the right store the earlier samples; thus as the counter reading increases from 0 to 15, earlier and earlier samples are being selected.

The key to the operation of the DPA2 is the control circuit which acts on multiphase sampling information and generates therefrom increment and decrement commands for the UP/DOWN counter, so that data phase excursions can be properly tracked without causing errors. This is the primary area in which the DPA2 differs from the DPA1. In addition to the in-phase and anti-phase samples employed for data recovery, digital phase aligners require additional samples to provide information to the control circuit. Obviously the phase aligner must not wait until the current sample point crosses a transition and generates errors to have the control circuit change the selected sample. As stated above, the DPA1 employs quartet sampling wherein the data stream is sampled at four quadrature points of the clock period. Further details of the DPA1 will be found in the aforementioned co-pending application.

Figure 5:
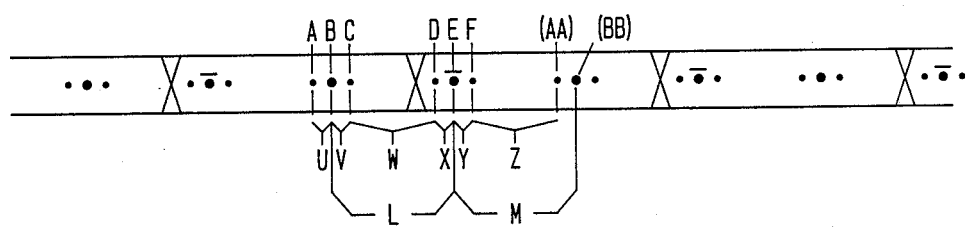
FIG. 5 illustrates the sextet sampling scheme of the present invention.

The sextet outrigger sampling employed by the DPA2 is illustrated in FIG. 5. As shown therein, the inphase (B) sample and the anti-phase (E) sample are each bracketed by a pair of closely-spaced outrigger samples, for a total of six samples per clock period. The six samples are labelled A through F, with A and C the outriggers of B, and D and F the outriggers of E. The control circuit, to be described, derives disagreements between samples for control purposes, a disagreement occurring if a transition occurs between the samples. These disagreements are labelled U through Z in FIG. 5. The L and M disagreements are those between the primary samples and these indicate whether the data transition lies in the first or last half-cycle of the local clock. All of the other disagreements are between adjacent samples as indicated in FIG. 5. For example, U is the disagreement between samples A and B and Y that between E and F. If a disagreement is binary 0 there is no transition between the samples and if it is binary 1 there is a transition.

Figure 6:
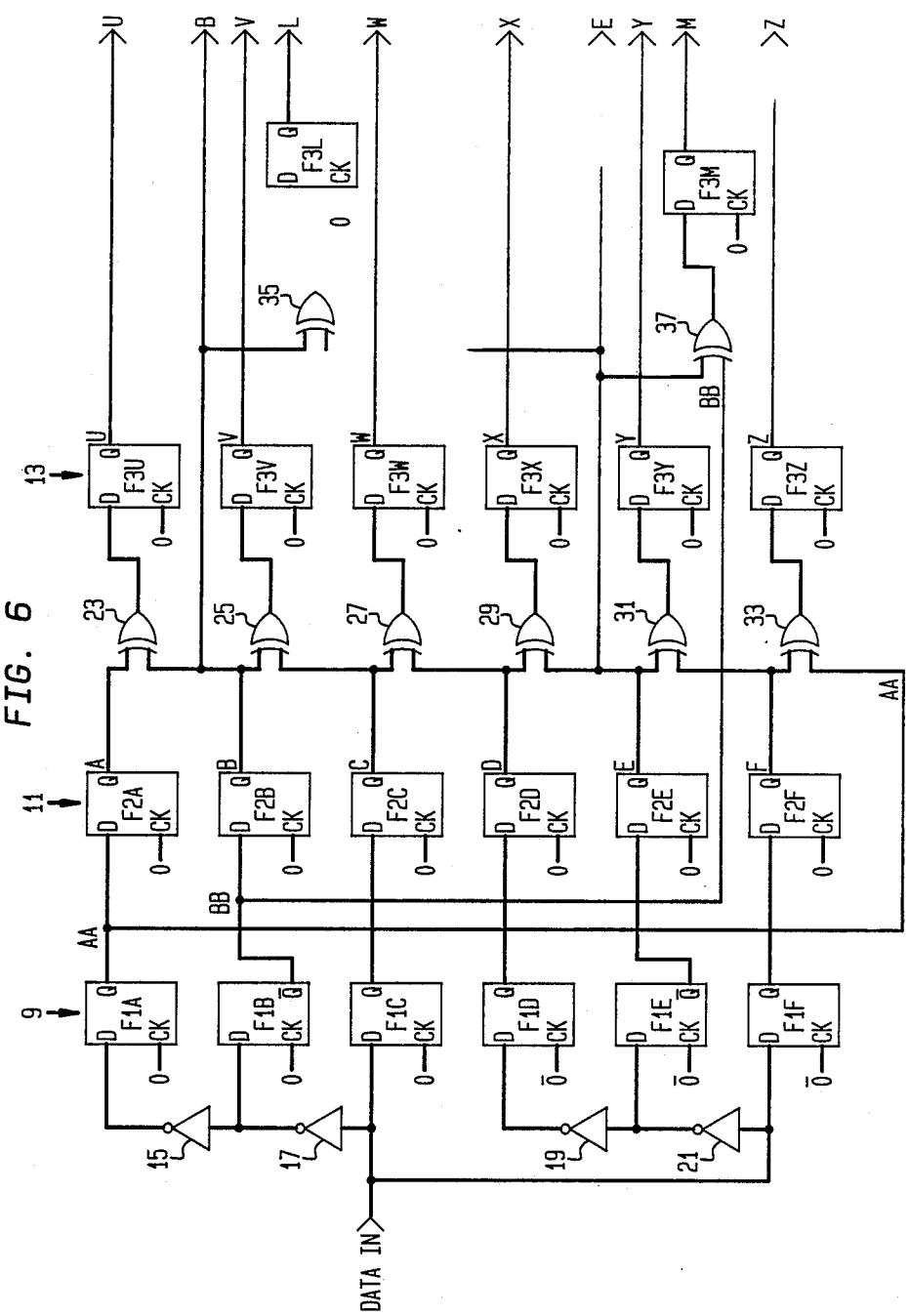
FIG. 6 is a block diagram of a sextet sampler.

An illustrative sextet sampler circuit which may be used to obtain and time-align the six samples per clock period is shown in FIG. 6. This circuit utilizes many D type flip-flops all of which are the same and all of which include D inputs, Q and $\bar{Q}$ outputs and clock inputs. The first column, 9, of six of these flip-flops, F1A–F1F, do the actual sextet sampling. The spacing of the outrigger samples is accomplished by the inherent inverter delays of inverters 15, 17, 19 and 21. The flip-flops F1A–F1C generate the first cluster of samples A–C, and thus all receive the same clock, namely the 0° clock. The inverter delays are in the data paths. The input data stream is applied directly to the D input of C sample flip-flop F1C, to the D input of B sample flip-flop, F1B, after being delayed in inverter 17, and to the D input of A sample flip-flop; F1A, after being further delayed by inverter 15. The delays of all four of these delay inverters are the same and are equal to the desired outrigger sample spacing. These inverters can be and are simple amplifiers, other than emitter followers, with an odd number of stages, usually one. The delay of such amplifiers is the inherent delay caused by such things as stray capacity. As stated above such inverters can be easily implemented on-chip. These delays can be implemented by other means, for example, by polysilicon delay lines or by voltage controlled delay circuits.

The 0° clocks of the flip-flops F1A-F1C will simultaneously cause each one of them to take a new sample at each positive clock transition. Thus F1A will sample the data signal at a point two outrigger spacings previous to the sample obtained from F1C to which the data stream is directly applied. Thus the three samples of the cluster will be in proper sequence with the proper spacing. The double inversion of the data signal applied to F1A results in an un-inverted data signal, but the inverted data signal applied to F1B would result in an inverted B sample if the Q output of F1B were utilized. The output sample BB is thus taken from the $\bar{Q}$ output of F1B. The other cluster of samples is obtained from the three flip-flops F1C-F1F which comprises circuitry similar to that described for obtaining the first sample cluster (A-C), but F1C-F1F are all clocked with an inverted clock signal, $\bar{0}$, which means that the samples are all taken on the negative-going transitions of the non-inverted clock and are thus are all displaced by 180° from the corresponding samples of the first cluster. The sample E is taken from the $\bar{Q}$ output of F1D to so compensate for the inverted data signal applied thereto.

The second column of flip-flops, 11, (F2A-F2F) time align the samples and are all clocked at 0° of the clock.

The Exclusive-Or gates 23, 25, 27, 29, 31 and 33 generate the disagreement signals U-Z by modulo-2 addition of the adjacent samples. Note from FIG. 5 that disagreement Z is defined as a difference between samples F and AA, the first sample of the following cluster, which is obtained from the output of F1A. The disagreement signals U-Z are subjected to a pipeline delay of one time slot in the column 13 of flip-flops F3U-F3Z. The gate 35 has the B and E samples as inputs and thus generates the disagreement L, which is delayed by F3L. The gate 37 has as inputs the BB and E samples and thus generates the signal M which is delayed by F3M. The primary samples B and E are applied to the sampler output for connection through the control circuit to the biphase register. All of the flip-flops of the sextet sampler are of the static metastable-resistant types as described in the aforementioned co-pending application.

Figure 7:
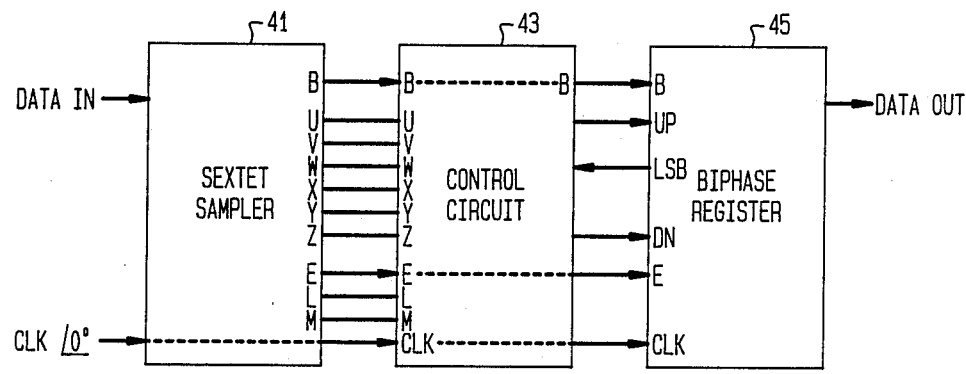
FIG. 7 is a high-level block diagram of the present invention showing the three major components thereof.

The high level or global block diagram of the DPA2 is shown in FIG. 7. It comprises the Sextet Sampler 41, the control circuit 43 and the biphase register 45, all connected in cascade with the connections shown. The control circuit takes the disagreement information and interprets it so as to cause the proper tap selection from the Biphase Register so that the data is tracked as its phase relative to the clock goes through multiple time slot excursions. This must be done in an error-free way in spite of ambiguous data caused by such things as pulse distortion, intersymbol interference, noise and mestastability.

The basic control algorithm, shown in the waveforms in FIG. 8 is quite simple. When an outrigger sample comes into disagreement with its primary sample, the sample selection is changed to a biphase register tap to select the opposite-phased sample which is approximately centrally located within the current data time slot or eye. The four key outrigger disagreements are thus U, V, X, and Y, which correspond to the four different combinations of drift direction and current sample being taken (B or E). The four different situations calling for a change of sample selections are shown in FIG. 8 each labelled with the type of outrigger disagreement which requires the selection change. The two waveforms labelled Y and V illustrate the case wherein the data period is less than the clock period (clock slow) and thus the samples are drifting to the right in these waveforms. In the waveform Y, the E or anti-phase sample is initially selected and the transition between the $E_n$ and $F_n$ samples generates the Y disagreement which calls for an Up count from the control circuit to increment the UP/DOWN counter and thus increment the selected biphase register tap by one which selects the B sample of one half a time slot earlier time. Similarly, in the second waveform the V disagreement results when the selected B sample and its outrigger sample C straddle a transition, and thus the counter must be incremented by one digit to select the anti-phase sample E of earlier time. In the third and fourth waveforms the data period is greater than the clock period (clock fast). In the third waveform, the U disagreement between the selected B sample and its outrigger A will generate a Down signal to decrement the counter by one digit, thus selecting the anti-phase sample E of a later time. In the fourth waveform the X disagreement generates a Down signal to decrement the counter to select the in-phase sample B of later time. These sample changes are indicated by the arrows in these waveforms.

Figure 9:
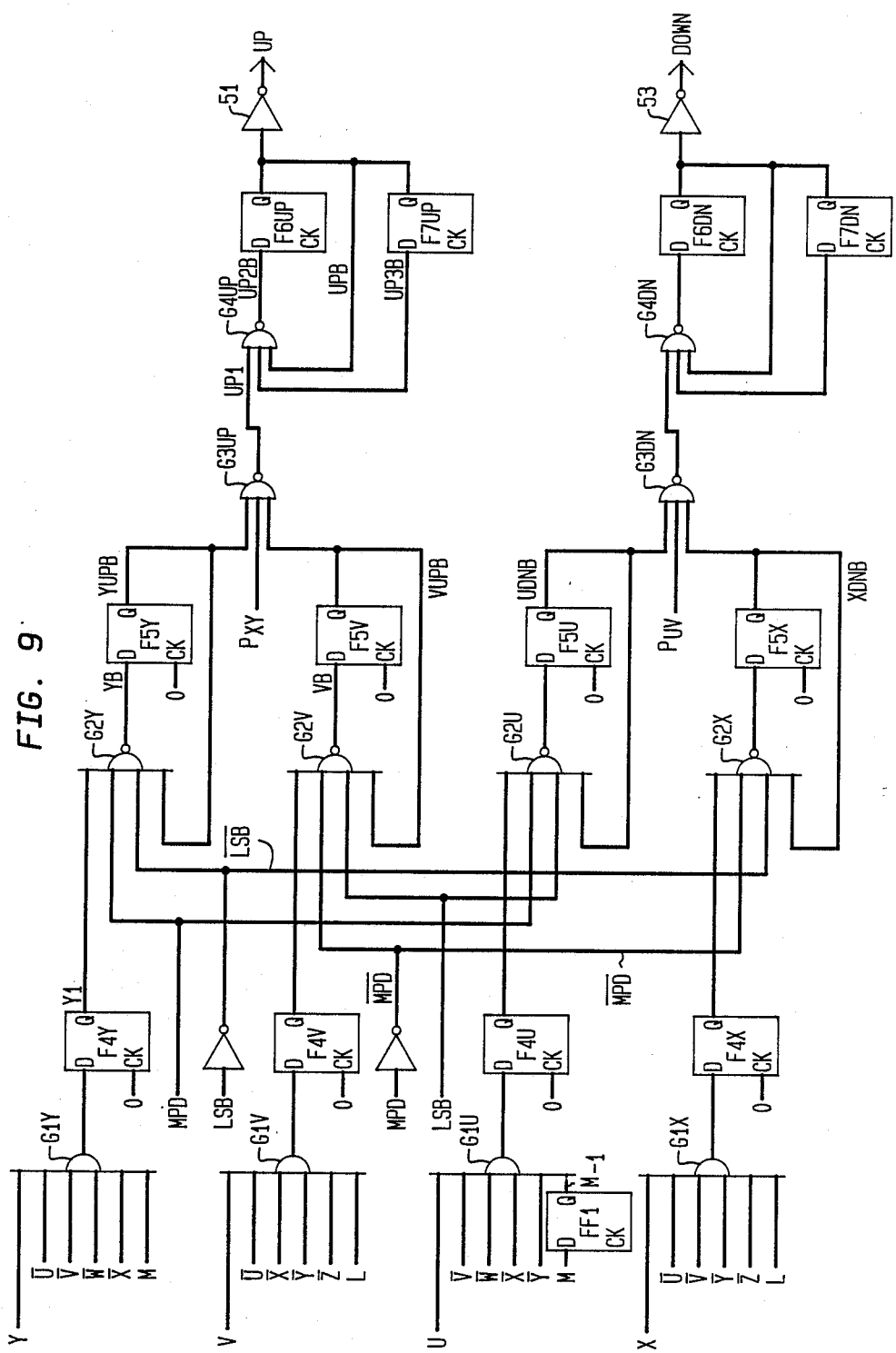
FIGS. 9–12 are block diagrams of an illustrative control circuit.

FIG. 9 shows a portion of an illustrative control circuit which can be used to implement the aforementioned basic control algorithm. The circuit consists of four similar channels of logic, corresponding to the four types of disagreements which call for action to change the selected sample. These channels are, starting from the top, the Y, V, U and X channels. The Y and V channels produce Up signals to the biphase register while the U and X channels produce Down (DN) signals. The AND gates G1Y, G1V, G1U, and G1X perform a consistency check which must be satisfied before the disagreement signal can pass to the subsequent circuitry. For example, the AND gate G1Y has as inputs X, $\bar{U}$, $\bar{V}$, $\bar{W}$, $\bar{X}$ and M. Thus in order for this gate to produce an output, there must be a Y and an M disagreement and no U, V, W, or X disagreements. Note that a Y disagreement is always accompanied by an M disagreement and thus the M disagreement is confirmation that the Y disagreement is valid. The other three G1 gates are similarly arranged. Note from FIG. 8 that U disagreements are always accompanied by an M$_{-1}$ disagreement, hence for the U channel the M$_{-1}$ disagreement is obtained by delaying the M disagreement by one time slot in flip-flop FF1. All of the flip-flops of FIG. 9 and D types and all are clocked at 0°.

The four gates G2 further implement the algorithm by requiring that action be taken to change the selected sample only if the proper type of sample (in-phase antiphase) is currently being taken. This information is provided by the least significant bit signal (LSB) which is fed back from the biphase register. If LSB=0 (and hence $\overline{LSB}$=1), the multiplexer is selecting anti-phase samples and if LSB is 1, the selected sample is in-phase. A further "legal moves" check is performed by the MPD signal, to be described below.

The outputs of the relevant G1 gates will be high (binary 1) if the disagreement signal of that channel is binary 1 and all the checks represented by the different G1 gate inputs are consistent. Thus in the Y channel the flip-flop F4Y will produce a high output Y1 if action is called for. The output of NAND gate G2Y will go low (binary 0) if action is called for. This occurs when all of its inputs are high, or binary 1. As can be seen from FIG. 8, Y disagreements require action only if the current selected sample is anti-phase and thus LSB=0. Thus the $\overline{LSB}$ input to G2Y will be binary 1 if E is the selected sample. The output YB of gate G2Y is normally high and hence the output YUPB of F5Y is also normally high. The signal YUPB is fed back as one input of gate G2Y. The input MPD must also be high to produce the low output required for action on Y disagreements. On the next positive clock after YB goes low, FSY goes low and the high input to gate G2Y from F5Y is removed and YB goes high again. This helps to insure that only one Up pulse will be produced by this channel, even though the disagreement may persist for several clock cycles. The need for this arises from the fact that the LSB does not change immediately due to pipelining delays.

The V channel circuitry and operation is similar to the Y channel except that the gate G2V has as inputs $\overline{MPD}$ and LSB, since action is required for V disagreements only if the selected sample is in-phase (B). The output VUPD of F5V is fed back to G2V to limit the output of this gate to one action pulse per V disagreement. The NAND gate G3UP has as inputs YUPD and VUPB and $\overline{P_{XY}}$, which is a special situation signal to be described below and which is normally high. Thus the output of G3UP (UP1) is normally low and if any one of its input goes low, UP1 will go high.

As stated above the delay in the change of LSB upon a change of the selected sample can cause multiple pulses at the output of the F5 flip-flop of the channel which is calling for action. The NAND gate G4UP and the flip-flops F6UP and F7UP prevent the passing of these multiple pulses until LSB has had time to change. The output UP2B of gate G4UP is normally high but low when action is called for. Thus the outputs UPB and UP3B of F6UP and F7UP are normally high and thus permit the first action pulse to pass gate G4UP to cause UP2B to go high. This causes UPB to go low on the following clock pulse and UP3B to go low on the next clock pulse. These two low signals at the inputs to G3UP lock out this gate for 2 cycles following an action pulse, by which time LSB will have changed state and G3UP will no longer produce any action pulses. The operation of the other two channels, U and X, is analogous to the channels just described. Note that the special action signal at the input to the NAND gate G3DN is $P_{UV}$. The NAND gate G3DN goes high whenever any of the three inputs thereof goes low, indicating either a U or X disagreement or a binary 0 at $P_{UV}$ all of which require a Down pulse. The gate G4DN and the associated flip-flops F6DN and F7DN serve the same function as the corresponding circuitry in the upper two channels. The inverters 51 and 53 invert the low action signals at the outputs of the F6UP and F6DN flip-flops. The resulting UP and DN signals are applied to the Biphase Register for incrementing or decrementing the counter thereof.

Figure 13:
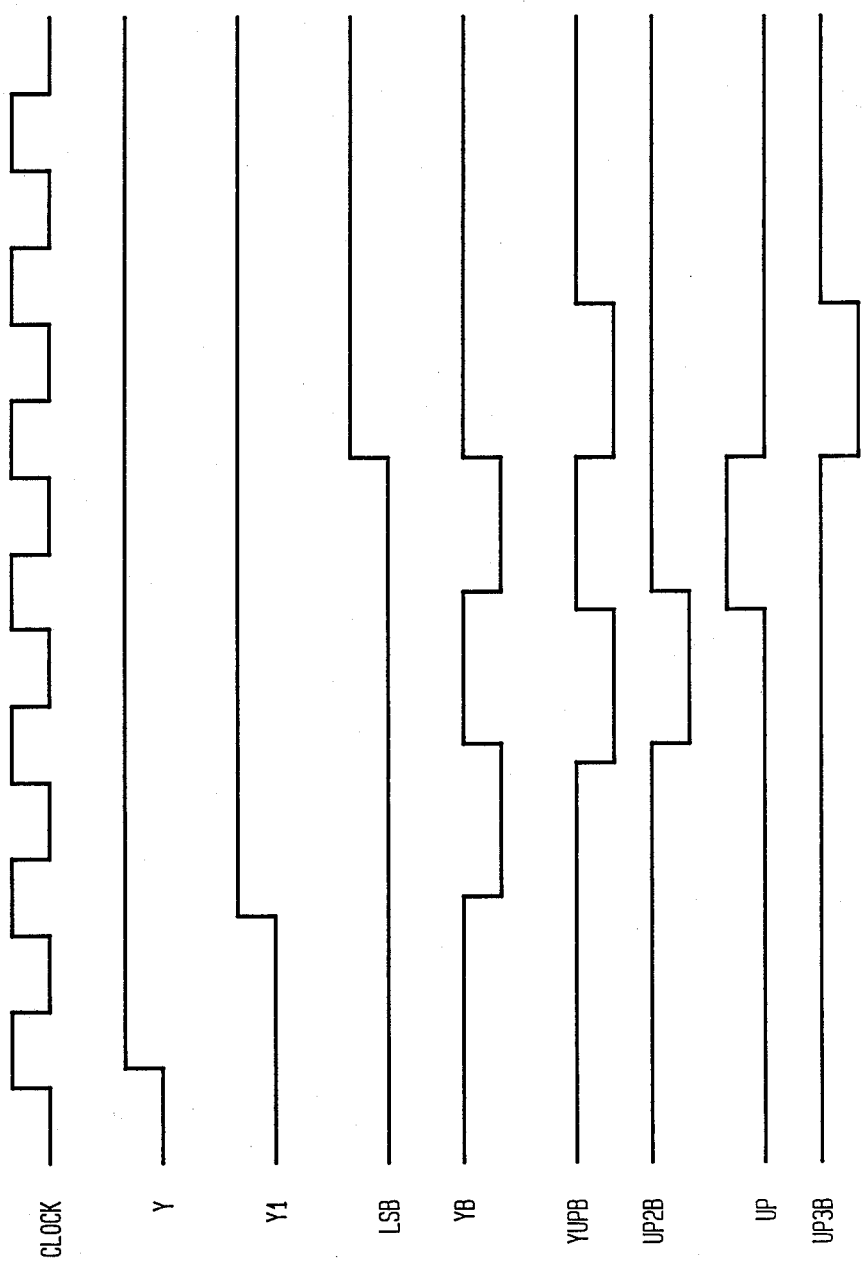
FIG. 13 are waveforms illustrating the operation of the control circuit.

The waveforms of FIG. 13 show the voltages at various points of the Y channel of FIG. 9 as a Y disagreement signal produces an UP pulse. The various waveforms correspond to the labelled lines of FIG. 9. Note that the negative-going pulse of the lower waveform, UP3B, inhibits the propagation of the second UP pulse on YUPB.

The operation of the digital phase aligner depends on the assumption that the data phase is changing slowly with respect to the local clock. This will be true if the phase excursions are caused for example by daily temperature variations of an optical transmission line wherein the phase may change only a few time slots in the course of a day. The circuit however must be designed to guard against localized sudden phase jumps which may be significantly less than one time slot but more than the distance between the primary and outrigger samples. The circuitry as described thus far could make an error under these conditions. This can be seen by referring back to line Y of FIG. 8 wherein the data transition has approached and passed the F sample from the right. If instead of generating the Y disagreement shown it had suddenly jumped leftward by a fraction of a nanosecond it might have generated an X disagreement which would have caused an erroneous Down signal rather than the proper Up signal.

Figure 10:
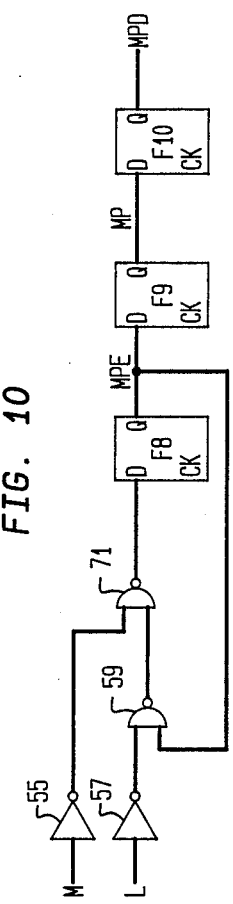

If the history of the transitions is known the circuit can be arranged to avoid this erroneous action. The "legal moves" circuit of FIG. 10 provides an output MPD which indicates whether the last data transition was in the first or last half of the clock cycle. The first and last half cycles of the clock correspond to the L and M disagreements, respectively. For example, a legal Y disagreement requires that the previous transition be in the latter (M) half of the clock cycle.

In FIG. 10 the L and M disagreements from the sextet sampler circuit are inverted by inverters 55 and 57. The inverted M signal forms one input of NAND gate 71, the other input of which is the output of NAND gate 59. The inputs of gate 59 are $\overline{L}$, the inverted L signal, and a latching feedback signal from the Q output of flip-flop F8. With this circuit, F8 indefinitely stores the L or M signal of the previous transition even though numerous transition-free clock periods may occur after the transition. The two flip-flops F9 and F10 merely delay the MPE signal from F8 by two clock periods. The MPD signal at the Q output of F10 will thus be high if the last transition produced an M disagreement and low if it produced an L disagreement. The signals MPD or its inversion $\overline{MPD}$ form one input of each of the NAND gates G2 of the control circuit of FIG. 9 to provide this consistency check. For example, the signal MPD is applied to G2Y in the Y channel since a valid Y disagreement requires that the preceding transition had occurred in the second or M half of the clock cycle.

Pulse distortion in the input data stream can cause rising transition edges to occur at significantly different times than falling edges. This situation could result in a data waveform in which binary 0's and binary 1's have different durations and thus the rising and falling transition edges could straddle a sample cluster with the rising edges to the left of the cluster and the falling edges to the right thereof. If the primary sample in the center of such a time slot is being taken, errors could occur and there would be no control action to detect this situation and to move the selected sample in one direction or the other. The pathology detection circuits of FIGS. 11 and 12 detect these situations and provide a remedy therefor by requiring either an arbitrary Up or Down count from the control circuit.

Figure 14:
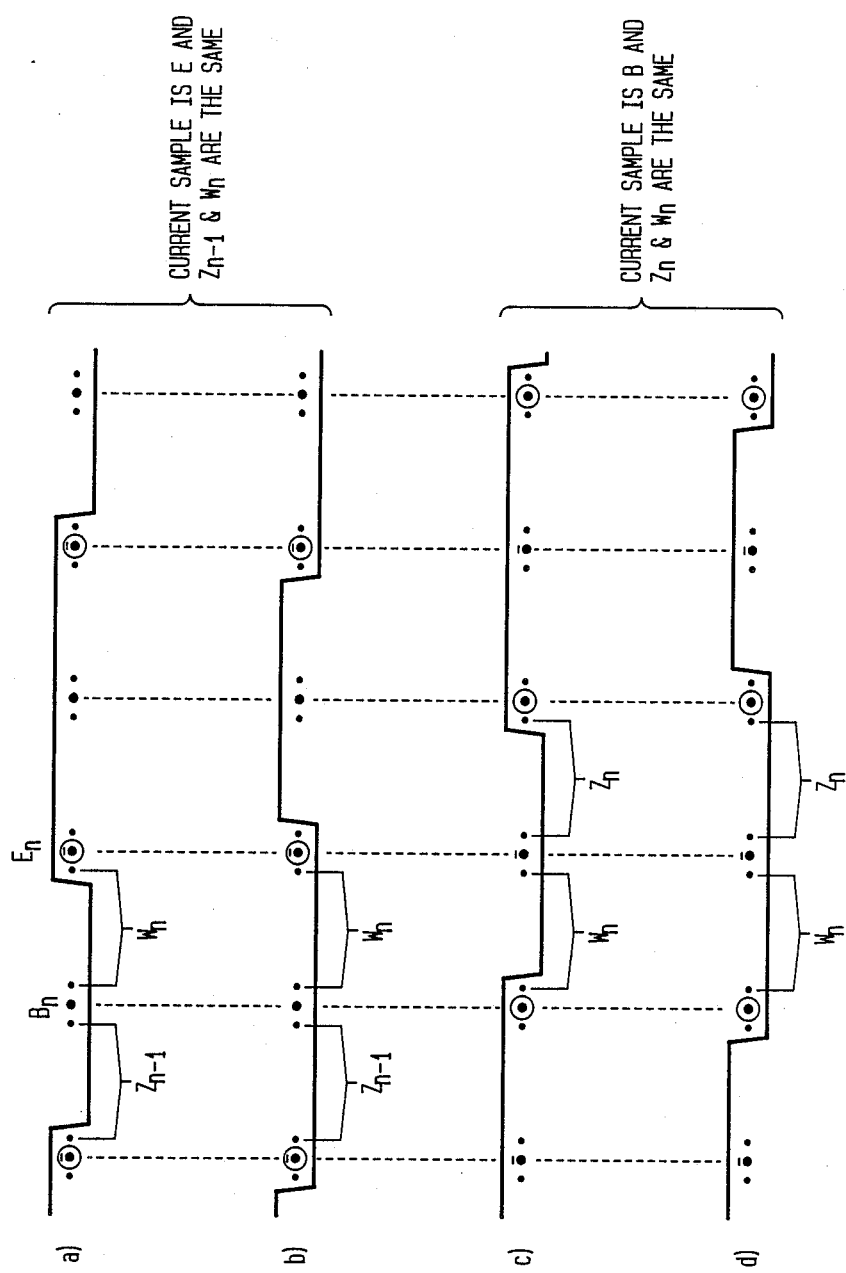

Waveforms depicting this situation are shown in FIG. 14. In FIGS. 14a and 14b the current selected sample is E (anti-phase) and the data has short binary 0 time slots and long binary 1 time slots due to the aforementioned causes. Note that in FIG. 14a, $Z_{n-1}$ and $W_n$ are the same, both binary 1. In FIG. 14b the longer binary 0 time slots cause both $Z_{n-1}$ and $W_n$ to be both binary 0 and thus are the same. In this situation some action is required to restore proper operation to the circuit and it can be either a single Up or Down pulse from the control circuit. FIGS. 14c and 14d illustrate the situations wherein the current sample is B (in-phase) and because of the asysemmetry of the data signal, both $Z_n$ and $W_n$ are the same. These situations also require a corrective Up or Down pulse from the control circuit. It should be pointed out that it would be very rare for the DPA2 to get into either of the states depicted in FIG. 14. It could happen during power-up initialization or due to a power supply surge.

Figure 15A:
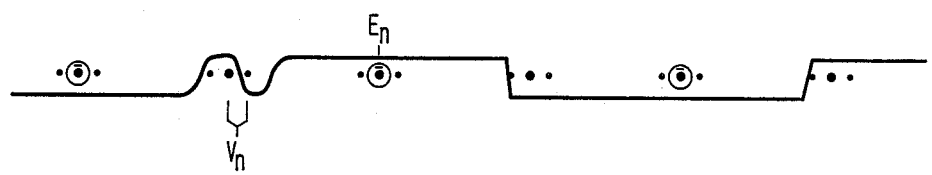
FIGS. 14, 15A are 15B are further waveforms illustrating the operation of the control circuits.
Figure 15B:
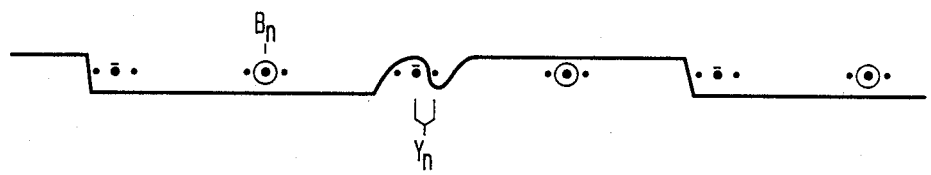

The digital phase aligner could also be fooled into taking erroneous action if a data glitch, for example an interference spike, causes a false transition pair to be generated, as depicted in FIG. 15. In FIG. 15a an erroneous Y disagreement has been generated. This situation can be prevented from causing erroneous sample changes by requiring that no U or V disagreements exist when the current sample selection is anti-phase (and thus LSB=0), and that no X or Y disagreements exist when the current sample selection is in-phase (and thus LSB=1).

Figure 11:
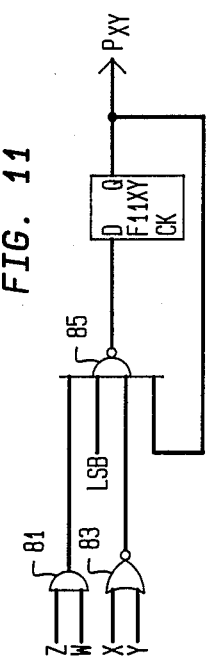
Figure 12:
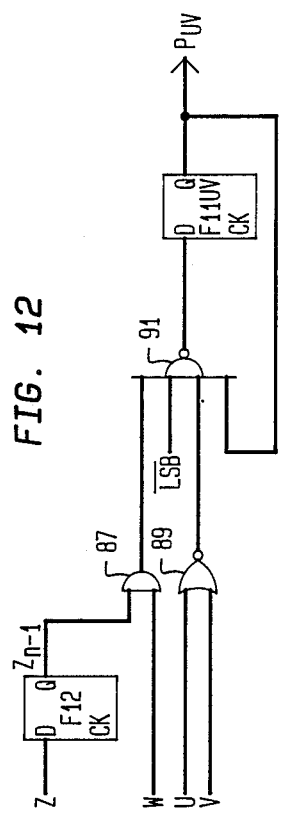

The circuitry of FIGS. 11 and 12 detect and correct all of the situations shown in FIGS. 14 and 15. The circuit of FIG. 11 is operative when LSB=1 and hence the in-phase (B) sample is being selected as shown in FIGS. 14c and 14b. The gate 81 will have a high output if the Z and W disagreements are the same. The NOR gate 83 will have a high output except when either X or Y disagreements exist. The output of flip-flop F11XY will be normally high and thus will provide the fourth high input to NAND gate 85 when the circuit functions. When the output of gate 85 goes low, $P_{XY}$ will go low and will produce an Up signal by virtue of its connection to gate G3UP of FIG. 9.

The circuit of FIG. 12 is operative when LSB=1 and hence the anti-phase (E) sample is being selected, as shown in FIGS. 14a and 14b. The gate 87 produces an output of $Z_{n-1}$ and W are both the same binary state. The gate 89 produces a high output except when either U or V are high to the normally high Q output of F11UV forms the fourth high input required to produce action. The four high inputs of gate 91 cause its output to go low to produce a low $P_{UV}$ signal which forms one onput of gate G3DN of FIG. 9. This low input will generate a Down signal for application to the counter of the biphase register.

The circuit of FIG. 10 is the legal moves control circuit. FIG. 11 is the XY pathological detector and FIG. 12 is the UV pathological detector.

While the invention has been described in connection with illustrative embodiments, obvious variations therein will be apparent to those skilled in the art, without the exercise of invention, and accordingly the invention should be limited only by the scope of the appended claims.

What is claimed is:

1. A phase aligner circuit having an input and an output and comprising a sampler circuit comprising means to obtain samples of a phasevarying input data stream at a plurality of phases of a local clock and means for generating disagreement signals indicating the occurrences of transitions between any pair of said samples, first register means for storing a sequence of in-phase samples of said data stream, second register means for storing a sequence of anti-phase samples of said data stream, control means for analyzing said disagreement signals and for causing samples stored in said first or said second register means to be connected to said output of said aligner circuit, and wherein said sampler circuit comprises means to obtain the said in-phase and anti-phase samples of said input data signal at the 0° and 180° phases of said local clock, respectively, and means to obtain two pairs of outrigger samples, each pair of which bracket one of said in-phase and anti-phase samples, the spacing between each of said outrigger samples and its associated in-phase or anti-phase sample being approximately the same and falling into the range of 1° to 89° in terms of the period of said local clock.

2. A phase aligner circuit for synchronizing an incoming digital data stream with a local clock, comprising, a multiphase sampler circuit having as inputs the said data stream and said clock, said sampler circuit comprising means for producing primary samples of said data stream at the in-phase (0°) and anti-phase (180°) points of said local clock, as well as two pairs of outrigger samples which closely bracket each of said primary samples, with the spacing between each of said primary samples and its said outrigger samples being less than 90° in terms of the period of said local clock, said sampler circuit further comprising means to generate disagreement signals whenever a data transition separates any of said six samples, a biphase register which provides an aligned bit stream output from multiple possible register taps, said register having as inputs the said in-phase and anti-phase samples, said register being clocked by said local clock, and a control circuit responsive to said disagreement signals to thereby determine from which tap of said biphase register circuit said aligned bit stream is taken.

3. The circuit of claim 2 wherein said circuit is implemented on a VSLI chip and wherein the delays utilized for providing said outrigger samples are achieved on-chip by inherent circuit delays.

4. The circuit of claim 2 wherein said circuit is implemented on a VLSI chip and wherein the delays utilized for providing said outrigger samples are achieved on-chip by voltage-controlled delay circuits.

5. A digital phase aligner circuit having an input and an output and comprising means to obtain primary samples of an input non-return-to-zero input data stream at the 0° and 180° points of a local clock as well as means to obtain two pairs of outrigger samples each of which bracket a different one of said primary samples, means to apply said primary samples to different halves of a biphase register which is clocked by said local clock, and a control circuit which acts on disagreements between said six samples and upon a disagreement between one of said primary samples and either of its outrigger samples produce either an Up or Down binary signal which is used to increment or decrement an Up-Down counter, and wherein the count or reading of said counter determines which of the taps of said biphase register is connected to said output of said phase aligner to provide an output signal aligned with said local clock.

6. The circuit of claim 5 wherein the spacing between each of said primary samples and each of their outrigger samples is less than 90° in terms of the period of said local clock and wherein said spacing is determined by the inherent delay of amplifiers, inverters or other circuitry which may be easily implemented on-chip.

7. A digital phase aligner circuit which produces an output signal which is aligned with a local clock from a phase-varying input signal, said circuit employing outrigger sextet sampling in which two primary samples of said input signal, taken at the 0° and 180° points of said local clock, are each bracketed by a pair of closely-spaced outrigger samples, said circuit further comprising a biphase register to which said two primary samples are applied, the output of said circuit being taken from one of the taps of said register, and control circuit means which changes the said tap from which said output is taken whenever any of said outrigger samples crosses a data transition of said input signal, whereby the other primary sample which is approximately centrally located in the same data time slot or eye will be selected for connection to the output of said circuit.

8. A digital phase aligner for synchronizing an incoming digital data stream with a local clock, comprising:

means to obtain six samples (A–F) of said data stream at six phases of said local clock, said B and E samples being taken respectively at the 0 and 180 degree phases of said clock, said A and C samples being closely-spaced outrigger samples of said B sample and said D and F samples being similarly closely-spaced outrigger samples of said E sample, means to perform modulo-2 addition of each adjacent pair of said samples to obtain six disagreement signals, a pair of similar shift registers one of which has the said A samples applied to the serial input thereof and the other of which has the said E samples applied to the serial input thereof, one of the taps of said shift registers comprising the phase-aligned output of said circuit, and logic means to analyze said disagreement signals and to change the said tap which is connected to the output of said circuit upon a disagreement between any of said outrigger samples and its primary (B or E) sample, whereby upon phase-slippage of said data stream relative to said clock, the shift register tap representing the other of said B or E samples will be selected for connection to said output, and wherein the newly-selected sample will be approximately centrally located within the same data time slot.

* * * * *